United States Patent
Soga et al.

(10) Patent No.: US 11,276,920 B2
(45) Date of Patent: Mar. 15, 2022

(54) ANTENNA STRUCTURE

(71) Applicants: NIHON DENGYO KOSAKU CO., LTD., Tokyo (JP); 3M INNOVATIVE PROPERTIES COMPANY, St. Paul, MN (US)

(72) Inventors: Tomoyuki Soga, Tokyo (JP); Akira Maruyama, Tokyo (JP); Hiroki Hagiwara, Tokyo (JP); Akihiko Yazaki, Kanagawa (JP); Takaya Yamauchi, Kanagawa (JP); Shingo Moriyasu, Tokyo (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/970,464

(22) PCT Filed: Feb. 21, 2018

(86) PCT No.: PCT/JP2018/006215
§ 371 (c)(1),
(2) Date: Aug. 17, 2020

(87) PCT Pub. No.: WO2019/163024
PCT Pub. Date: Aug. 29, 2019

(65) Prior Publication Data
US 2021/0075099 A1 Mar. 11, 2021

(51) Int. Cl.
*H01Q 1/44* (2006.01)
*H04W 88/08* (2009.01)
*H01Q 1/24* (2006.01)
*H01Q 3/36* (2006.01)
*H01Q 25/00* (2006.01)

(52) U.S. Cl.
CPC .............. *H01Q 1/44* (2013.01); *H01Q 1/246* (2013.01); *H01Q 3/36* (2013.01); *H01Q 25/001* (2013.01); *H04W 88/085* (2013.01)

(58) Field of Classification Search
CPC ............ H01Q 1/44; H01Q 1/246; H01Q 3/36; H01Q 25/001; H04W 88/085
USPC ....................................... 455/562.1
See application file for complete search history.

(56) References Cited

U.S. PATENT DOCUMENTS

| 3,842,417 | A | 10/1974 | Williams |
| 7,196,674 | B2 | 3/2007 | Timofeev |
| 2003/0043084 | A1 | 3/2003 | Egashira |
| 2012/0313823 | A1 | 12/2012 | Armstrong |

(Continued)

FOREIGN PATENT DOCUMENTS

| CN | 201 435 452 | 3/2010 |
| CN | 103 247 868 | 8/2013 |

(Continued)

OTHER PUBLICATIONS

International Search Report for PCT/JP2018/006215 dated May 1, 2018 (2 pages).

*Primary Examiner* — Lee Nguyen

(57) ABSTRACT

Provided is an antenna structure that can be attached with ease and is likely to blend into environments. An antenna structure 1 includes: plural antenna elements 10 configured individually and arranged discretely; and a base 60 which adheres to at least side surfaces of the antenna elements 10, in which the plural antenna elements 10 are embedded and fixed, and which forms a plate-like outer shape.

15 Claims, 8 Drawing Sheets

(56) References Cited

U.S. PATENT DOCUMENTS

| | | | |
|---|---|---|---|
| 2012/0326931 A1 | 12/2012 | Murayama | |
| 2014/0180365 A1 | 6/2014 | Perryman | |
| 2021/0075099 A1* | 3/2021 | Soga | ........................ H01Q 1/44 |

FOREIGN PATENT DOCUMENTS

| | | |
|---|---|---|
| JP | S59 110204 | 6/1984 |
| JP | H11-355038 | 12/1999 |
| JP | 2003-115712 | 4/2003 |
| JP | 3096612 | 9/2003 |
| JP | 2005 033517 | 2/2005 |
| JP | 2007-336305 | 12/2007 |
| JP | 2008-252303 | 10/2008 |
| JP | 2013-511917 | 4/2013 |
| JP | 2016-189839 | 11/2016 |
| WO | WO 2004/070878 | 8/2004 |
| WO | WO 2011/108340 | 9/2011 |

* cited by examiner

FIG.7A
FIG.7C
FIG.7B
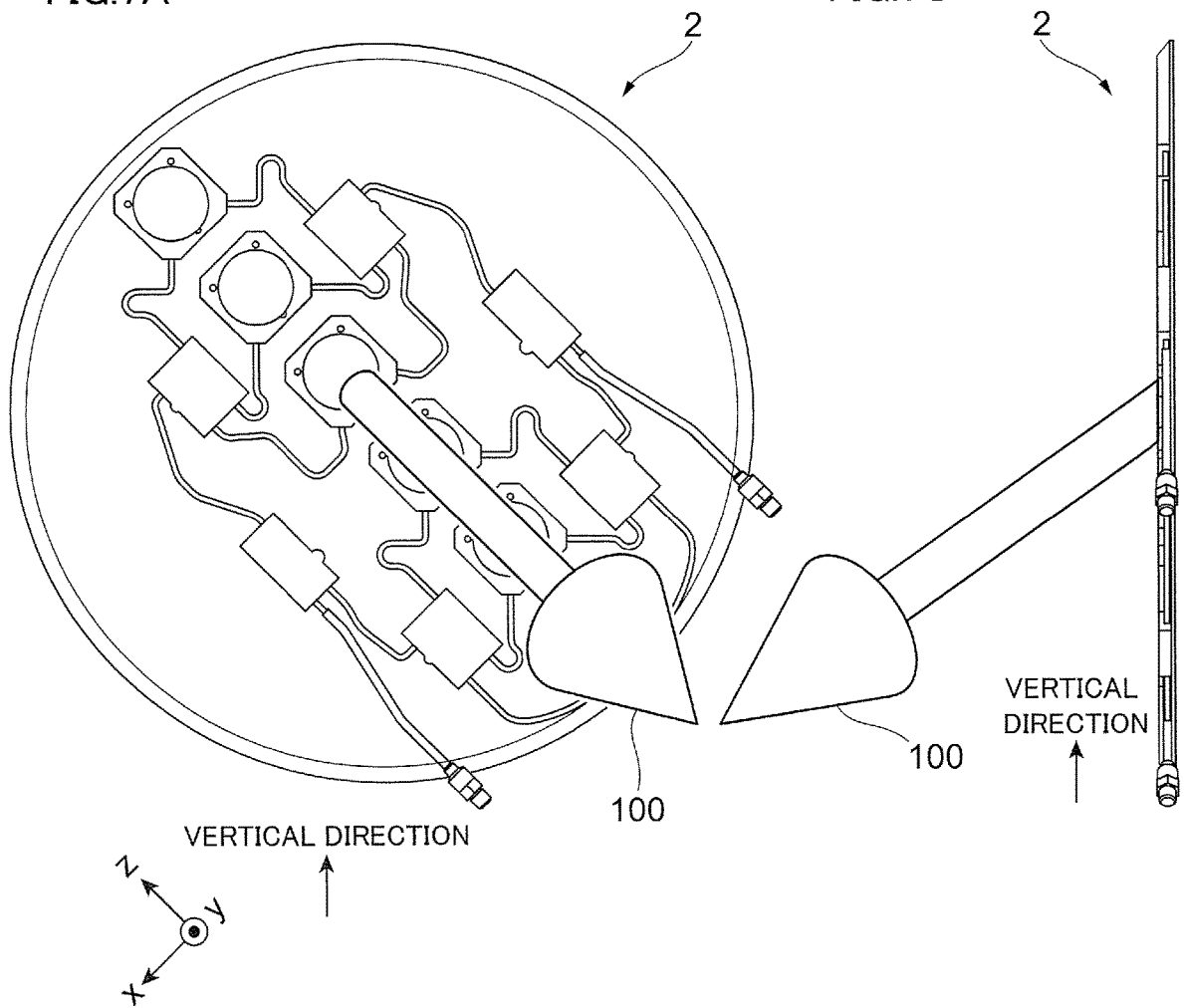
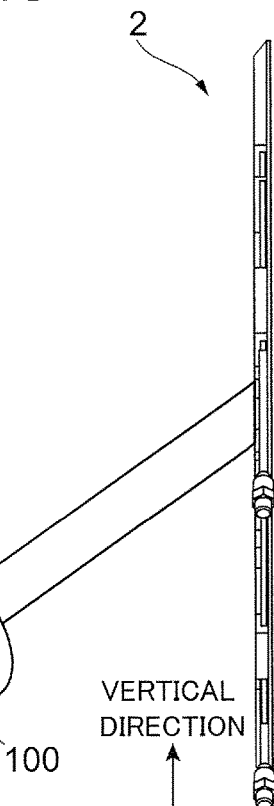
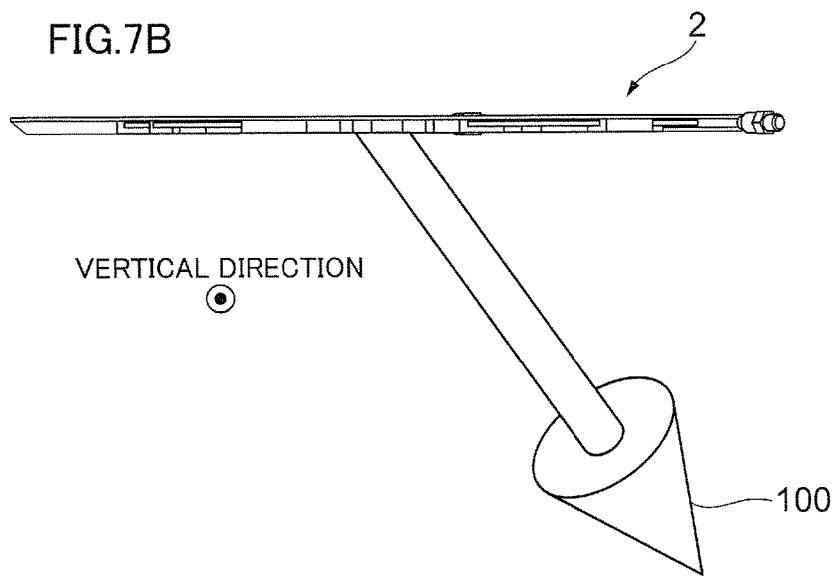

ANTENNA STRUCTURE

This application is a U.S. National Stage Application of International Application No. PCT/JP2018/006215 filed Feb. 21, 2018, which was published in English on Aug. 29, 2019 as International Publication No. WO 2019/163024 A1.

TECHNICAL FIELD

The present invention relates to an antenna structure.

BACKGROUND ART

Patent Document 1 describes a method of waterproofing and supporting an antenna element in which an antenna element in a flat-plate shape is set in a cavity of a mold, and a synthetic resin material in a fluidized state is injected into a gap formed between the flat-plate-shaped antenna element and an inner wall of the cavity and solidified, to thereby seal and contain the flat-plate-shaped antenna element in a synthetic resin package.

Patent Document 2 describes an antenna that is low profile and capable of resisting environmental and physical impact. The antenna can be mounted on vehicles, aircraft, spacecraft, manhole covers, utility covers, equipment cabinets, personnel, and animals.

Patent Document 3 describes a wireless communication module including a flexible laminate base plate configured from multiple laminated flexible base materials and having a cavity, a wireless IC chip disposed in the cavity, and a sealant which fills the cavity so as to cover the wireless IC chip. The sealant is a material more rigid than the flexible base material. Loop-form electrodes configured from coil patterns are built into the flexible laminate base plate, and the loop-form electrodes are electrically connected to the wireless IC chip.

CITATION LIST

Patent Literature

Patent Document 1: Japanese Patent Application Laid-Open Publication No. 2003-115712
Patent Document 2: National Publication of International Patent Application No. 2013-511917
Patent Document 3: International Publication No. WO 2011/108340

SUMMARY OF INVENTION

Technical Problem

Incidentally, in installing an antenna, in many cases, it is necessary to give considerations to landscapes or environments and it is required to make the antenna difficult to be noticed. However, since conventional antennas were large and thick, reluctances were frequently shown to installation of the antennas. Moreover, the antennas were large, thick, and heavy; therefore, ambitious construction was required and places of installation were limited.

An object of the present invention is to provide an antenna structure that can be attached with ease and is likely to blend into environments.

Solution to Problem

The invention described in claim 1 provides an antenna structure including: plural antenna elements configured individually and arranged discretely; and a base adhering to at least side surfaces of the plural antenna elements, being embedded with the plural antenna elements to fix thereof, and forming an outer shape of the antenna structure into a plate shape.

The invention described in claim 2 is the antenna structure described in claim 1, further including a distributor configured separately from the plural antenna elements, the distributor distributing a signal to the plural antenna elements, combining a signal from the plural antenna elements or changing a phase of a signal, and being embedded in the base to be fixed with at least a side surface of the distributor adhering to the base.

The invention described in claim 3 is the antenna structure described in claim 2, wherein the plural antenna elements and the distributor are connected by a coaxial cable being embedded in the base and having flexibility.

The invention described in claim 4 is the antenna structure described in claim 2 or 3, wherein the base is constituted by a material having flexibility, and the antenna elements and the distributor are constituted by a material not having flexibility.

The invention described in claim 5 is the antenna structure described in claim 4, wherein the material constituting the base has a hardness not more than a Shore D hardness of 60.

The invention described in claim 6 is the antenna structure described in any one of claims 1 to 5, wherein the plural antenna elements are arranged in a line.

The invention described in claim 7 is the antenna structure described in any one of claims 1 to 6, wherein the base has a circular or polygonal planar shape.

The invention described in claim 8 is the antenna structure described in claim 7, wherein the base is rotated around a center of the planar shape of the base as an axis, to thereby make a direction of a tilt constituted by the plural antenna elements correspond to a bearing angle of radio frequencies.

The invention described in claim 9 is the antenna structure described in claim 1, wherein each of the plural antenna elements includes a radiation element part radiating or receiving radio frequencies, the radiation element part being separated from the base inside the antenna element.

The invention described in claim 10 is the antenna structure described in claim 9, wherein each of the plural antenna elements includes a gap or a foam constituting an air layer on the radiation element part.

The invention described in claim 11 is the antenna structure described in claim 2, wherein the distributor includes a distribution circuit propagating a signal, the distribution circuit being separated from the base inside the distributor.

The invention described in claim 12 is the antenna structure described in claim 11, wherein the distributor includes a gap or a foam constituting an air layer on the distribution circuit.

The invention described in claim 13 is the antenna structure described in claim 1, wherein each of the plural antenna elements includes a radiation element part transmitting or receiving radio frequencies, the radiation element part being a patch antenna provided with a radiation electrode and a ground electrode facing each other, and the radiation electrode has a circular planar shape and is provided with two feeding electrodes to make it possible to transmit or receive radio frequencies of cross polarizations.

The invention described in claim 14 is the antenna structure described in claim 13, wherein the plural antenna elements are arranged in a line to constitute a sector antenna, and distributors each distributing a signal to the plural antenna elements, combining a signal from the plural antenna elements or changing a phase of a signal are provided to correspond to the respective cross polarizations, the distributors being divided to be provided on both sides of an array arranging the plural antenna elements.

The invention described in claim 15 is the antenna structure described in claim 14, further including input-output signal lines corresponding to the respective cross polarizations, the input-output signal lines inputting signals from outside and outputting signals to outside, wherein the input-output signal lines are drawn out of the base in a direction along the array of the plural antenna elements.

Advantageous Effects of Invention

According to the invention described in claim 1, it becomes possible to make the antenna structure be easily attachable and blend into environments.

According to the invention described in claim 2, input/output of the signal is easily performed, as compared to the case in which a distributor is not provided.

According to the invention described in claim 3, effects on the characteristics by the base can be suppressed, as compared to the case in which the coaxial cable is not used.

According to the invention described in claim 4, it is possible to make the antenna structure have the flexibility as a whole, as compared to the case in which the base is not constituted by the material having flexibility.

According to the invention described in claim 5, it is possible to follow the curved state in the place of installation, as compared to the case in which the Shore D hardness is more than 60.

According to the invention described in claim 6, the antenna elements can function as a sector antenna, as compared to the case in which the antenna elements are not arranged in a line.

According to the invention described in claim 7, differences in appearance cannot be seen by rotation of the antenna structure around the center, as compared to the case in which the base does not have the circular or polygonal planar shape.

According to the invention described in claim 8, it is possible to change the bearing angle, as compared to the case in which the antenna structure is not rotated.

According to the invention described in claim 9 or 11, variations in the characteristics can be suppressed, as compared to the case in which the radiation element part or the distribution circuit is not separated from the base.

According to the invention described in claim 10 or 12, the characteristics of the antenna element or the characteristics of the distribution circuit as a single item can be maintained, as compared to the case in which the gap or foam is not provided.

According to the invention described in claim 13, it is possible to transmit or receive the radio frequencies of the cross polarizations by the single radiation electrode, as compared to the case in which the two feeding electrodes are not provided.

According to the invention described in claim 14, the distributors can be arranged with ease, as compared to the case in which the distributors am not arranged on the both sides of the array.

According to the invention described in claim 15, the input-output signal lines can be arranged with ease, as compared to the case in which the input-output signal lines are not arranged in the direction along the array of the antenna elements.

BRIEF DESCRIPTION OF DRAWINGS

FIGS. 3A and 3B show diagrams illustrating a structure of an antenna element, wherein FIG. 3A is a cross-sectional view of vicinity of the antenna element (a cross-sectional view in the x direction in FIG. 2), and FIG. 3B is a plan view of a radiation element part of the antenna element;

FIG. 5A is a plan view and FIG. 5B is a side elevational view;

FIG. 6A is a front elevational view, FIG. 6B is a side elevational view and FIG. 6C is a top view;

FIGS. 7A and 7B show diagrams showing a case in which the antenna structure is set so that an array of the antenna elements (z direction) faces an oblique direction tilted from the vertical direction, where FIG. 7A is a front elevational view, FIG. 7B is a side elevational view and FIG. 7C is a top view.

DESCRIPTION OF EMBODIMENTS

The radio frequencies handled by a base station antenna are increasing to five, six, and so forth. For this reason, accommodation of plural antenna elements provided in accordance with the number of radio frequencies in a single radome approaches the limit. In addition, the radio frequencies to be added in the future have high frequencies. The higher the frequency, the more the straightness and the shorter the range.

Therefore, an antenna has been formed into low profile corresponding to high frequency and has been provided with flexibility in some situations, to thereby make it possible to install the antenna with ease by attaching thereof to a wall, ceiling, floor or the like in a room, a wall surface of a building, a pillar provided on a road, a road surface or the like, and to thereby consider an antenna structure that is sensitive to landscapes or environments. By making an antenna with an antenna structure having such a structure, the need for attachment hardware is eliminated and the installation cost can be reduced.

Hereinafter, exemplary embodiments according to the present invention will be described in detail with reference to attached drawings.

First Exemplary Embodiment

Figure 1:
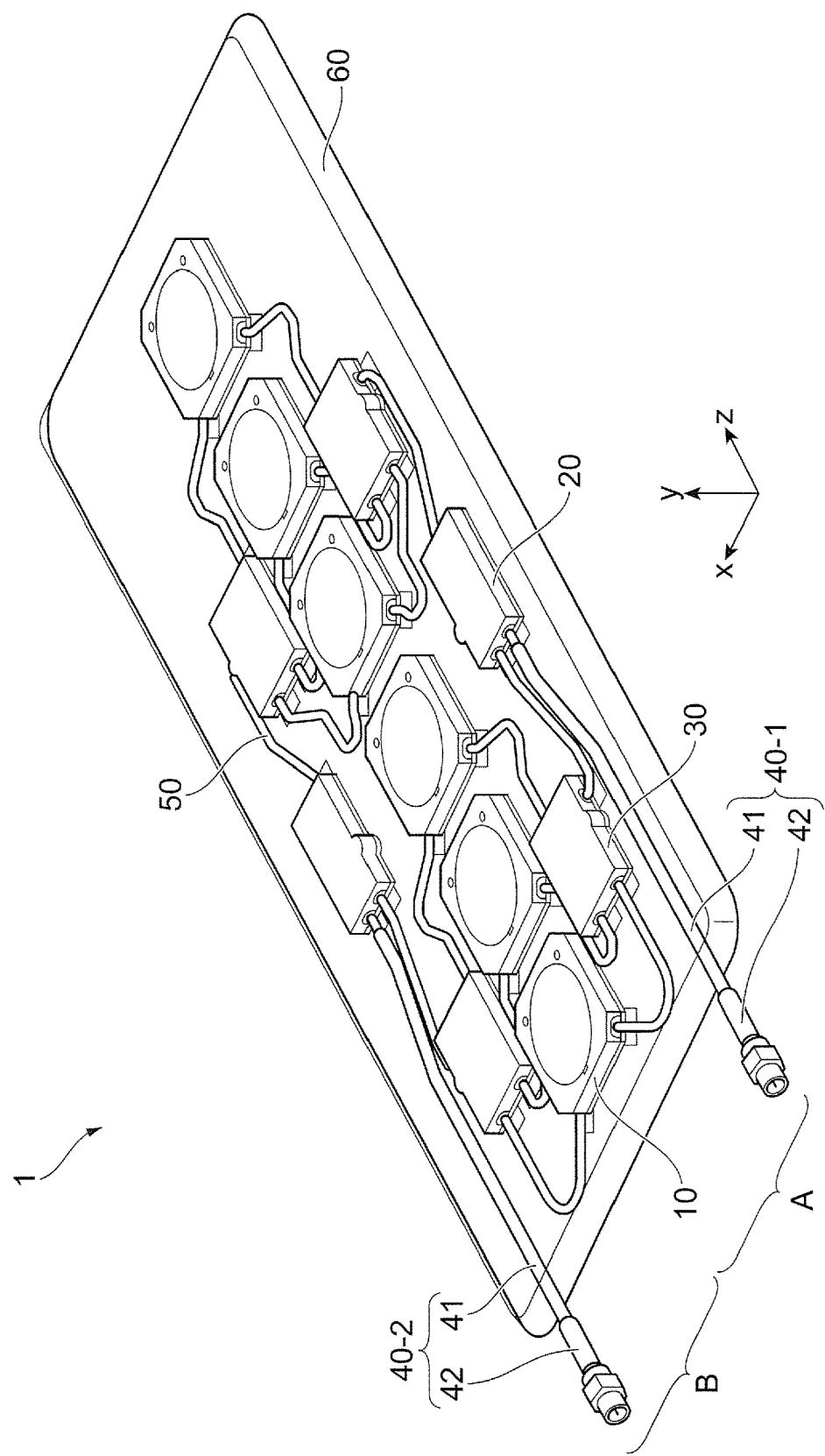
FIG. 1 is a perspective view of an example of an antenna structure to which the first exemplary embodiment is applied.

FIG. 1 is a perspective view of an example of an antenna structure 1 to which the first exemplary embodiment is applied. Here, it is assumed that a base 60 to be described later is transparent, and thereby the interior of the antenna structure 1 can be observed.

The antenna structure 1 is configured to have a plate-like outer shape. The antenna structure 1 includes: plural (in FIG. 1, six) antenna elements 10 transmitting or receiving the radio frequencies; distributors 20 and 30 distributing signals to the antenna elements 10 or combining signals from the antenna elements 10; and input-output signal lines 40-1 and 40-2 transmitting signals to the antenna structure 1 or receiving signals from the antenna structure 1. Hereinafter, transmitting and receiving signals are collectively referred to as signal transmission/reception.

Here, the antenna structure 1 functions as a sector antenna in which the antenna elements 10 are arranged in a line. The antenna structure 1 is of a dual polarization type in which one group of polarizations is transmitted or received on the side A and the other group of polarizations is transmitted and received on the side B. Accordingly, two input-output signal lines 40 are provided: A-side signals are transmitted and received by the input-output signal line 40-1, and B-side signals are transmitted and received by the input-output signal line 40-2. In the case where the input-output signal lines 40-1 and 40-2 are not distinguished, they are referred to as the input-output signal lines 40. Here, the direction in which the antenna elements 10 are arranged in a line is assumed to be the z direction, and the direction along the plate-like surface of the antenna structure 1 and orthogonal to the direction in which the antenna elements 10 are arranged in a line (z direction) is assumed to be the x direction. Then, the direction orthogonal to the x direction and z direction in the right-hand screw relationship is assumed to be the y direction. Further, the surface of the antenna structure 1 viewed from the +y direction is referred to as the front surface of the antenna structure 1, and the surface of the antenna structure 1 viewed from the −y direction is referred to as the back surface of the antenna structure 1. Note that the surface viewed from the direction orthogonal to the y direction is referred to as the side surface. The back surface side of the antenna structure 1 is referred to as the lower side, and the front surface side of the antenna structure 1 is referred to as the upper side. The same is true in the antenna elements 10 and the distributors 20 and 30.

Moreover, by use of a two-branch distributor 20 and a three-branch distributor 30, signal distribution and signal combination are performed in two stages. The distributor 30 is provided on the antenna elements 10 side and the distributor 20 is provided on the input-output signal line 40 side. The input-output signal line 40 is constituted by a coaxial cable 41 and a connector 42, in which one end portion of the coaxial cable 41 is connected to the distributor 20 and the other end portion thereof is connected to the connector 42. The antenna structure 1 is connected to a not-shown signal input/output device via the connector 42.

The antenna structure 1 includes plural signal lines 50 connecting between the antenna elements 10 and the distributors 30 and between the distributors 20 and the distributors 30. Here, the signal line 50 is a coaxial cable having flexibility, as an example.

Further, the antenna structure 1 includes a base 60 embedding and accommodating the antenna elements 10, the distributors 20 and 30, and the signal lines 50. Note that apart of the coaxial cable 41 and the connector 42 of the input-output signal line 40 are protruded to the outside from the base 60.

Each of the antenna elements 10, the distributors 20 and 30 is configured as an individual (separate) component (module) without flexibility (with rigidity). The antenna elements 10 are discretely arranged. The structures of the antenna elements 10, the distributors 20 and 30 will be described later.

Note that to have the flexibility refers to the property of being bent in accordance with a force of bending when it is to be bent. On the other hand, to have no flexibility (to have rigidity) refers to a configuration that is not assumed to be bent; however, does not refer to a property of not completely being bent. Consequently, as will be described later, even in the case where the base 60 has the flexibility and the base 60 is deformed by bending, the antenna elements 10, the distributors 20 and 30 do not follow the bending deformation of the base 60 and are not deformed.

On the other hand, as will be described later, the base 60 is constituted by resin, for example, epoxy, urethane, or polyimide. Consequently, the base 60 is embedded with the antenna elements 10, the distributors 20 and 30, the input-output signal lines 40 and the signal lines 50 to fix the relative positions of the antenna elements 10, the distributors 20 and 30 and the like, as well as forms (molds) the outer shape of the antenna structure 1 into a plate shape. In other words, the antenna structure 1 is in the state of being solidified by the base 60. The base 60 will be described later.

The base 60 is embedded with asperities formed by the antenna elements 10, the distributors 20 and 30 and so forth, to thereby make the back surface and the front surface of the antenna structure 1 flat.

Consequently, the antenna structure 1 is in the plate shape. Note that to be flat refers to the asperities formed by the antenna elements 10, the distributors 20, 30 and so forth in a degree not being sensed. Note that the back surface and the front surface of the antenna structure 1 are in parallel with each other here.

In FIG. 1, the antenna structure 1 has a rectangular plate-like planar shape, and the side surface thereof is tapered. In other words, the front surface is small as compared to the back surface. In the antenna structure 1, the side surface may be perpendicular to the front surface and the back surface; to the contrary, the side surface may be conversely tapered to make the back surface small as compared to the front surface. The reason why the side surface is tapered is to obscure the thickness of the antenna structure 1 (a magnitude in the y direction). The thickness of the antenna structure 1 varies in accordance with the frequencies to be used. Accordingly, in the case where the antenna structure 1 is thin, it is not required to taper the side surface.

Then, composition of the base 60 by a material having the flexibility allows the antenna structure 1 to have the flexibility as a whole. In other words, use of the coaxial cable having the flexibility as the signal line 50 causes the antenna structure 1 to have the flexibility as a whole even though the antenna elements 10, the distributors 20 and 30 are constituted by components that do not have the flexibility (that have the rigidity). In particular, by constituting each of the antenna elements 10, the distributors 20 and 30 to occupy a small area in the antenna structure 1, the flexibility of the antenna structure 1 is increased. Here, the two-branch distributor 20 and the three-branch distributor 30 are adopted to distribute the signals to the six antenna elements 10; however, a six-branch distributor may be used. In the case where the area occupied by each of the distributors 20 and 30 is smaller than the area occupied by the six-branch distributor, it is preferable to adopt the distributors 20 and 30 separated into the two stages.

Moreover, by avoiding overlapping arrays of the antenna elements 10, the distributors 20 and 30 in the direction orthogonal to the bending direction in the antenna structure 1 to secure a bendable region, the antenna structure 1 is more likely to be bent.

With such an antenna structure 1, coating of an adhesive in advance to one of the front surface and the back surface by a double-faced tape or the like makes it possible to install the antenna structure 1 with ease by attaching thereof to a wall, a ceiling, a floor or the like in doors. At this time, the antenna structure 1 provided with flexibility is likely to be attached to a wall or a pillar having a curved surface. Attaching a sheet on which a pattern like the wall, ceiling or floor is drawn to a surface of the antenna structure 1 not coated with the adhesive enables the antenna structure 1 to blend into environments with ease. Moreover, if the wall, ceiling, or floor is constructed after the antenna structure 1 is embedded in the wall, ceiling or floor, the antenna structure 1 is difficult to be seen (visually observed). In addition, it may be possible to take a photograph of a state before the antenna structure 1 is attached and to print the photograph on a film, and after the antenna structure 1 is attached, the film on which the state before attaching the antenna structure 1 is printed may be pasted on a surface of the antenna structure 1. With this, the state before the antenna structure 1 is attached can be reproduced.

Note that patterns may be drawn on a surface of the antenna structure 1 not coated with the adhesive. For example, on the surface of the antenna structure 1 not coated with the adhesive, labeling of a name such as "Meeting Room A" or "evacuation area", or guidance display such as "evacuation route->" may be provided in advance. In addition to the patterns of the wall, ceiling, floor or the like, drawings such as labeling of names, guidance displays or the like provided on the surface of the antenna structure 1 not coated with the adhesive are referred to as pictures. Note that, in the case where a picture is provided on a film, it is preferable that the film rarely affects characteristics of the antenna.

Thus, the antenna structure 1 blends into the environments and does not damage the landscapes and atmosphere.

Moreover, the antenna structure 1 may be embedded in a surface portion of a road. At this time, also, the antenna structure 1 provided with flexibility makes it possible to attach the antenna structure 1 onto the mad surface to follow the irregularities thereon. In this case, strength not to be broken by a vehicle or the like that runs on or goes through is required of the antenna structure 1. Even in this case, since the antenna structure 1 is solidified by the base 60, the strength is likely to be kept according to selection of a material constituting the base 60.

As described above, the antenna elements 10, the distributors 20 and are constituted as the components that do not have the flexibility (that have the rigidity), whereas the input-output signal lines 40 and the signal lines 50 are constituted by the coaxial cables having the flexibility. Consequently, even though the base 60 is constituted by a material having the flexibility to cause the antenna structure 1 to have the flexibility as a whole, variations in the characteristics as the antenna can be suppressed.

Hereinafter, the antenna structure 1 will be described in more detail.

Figure 2:
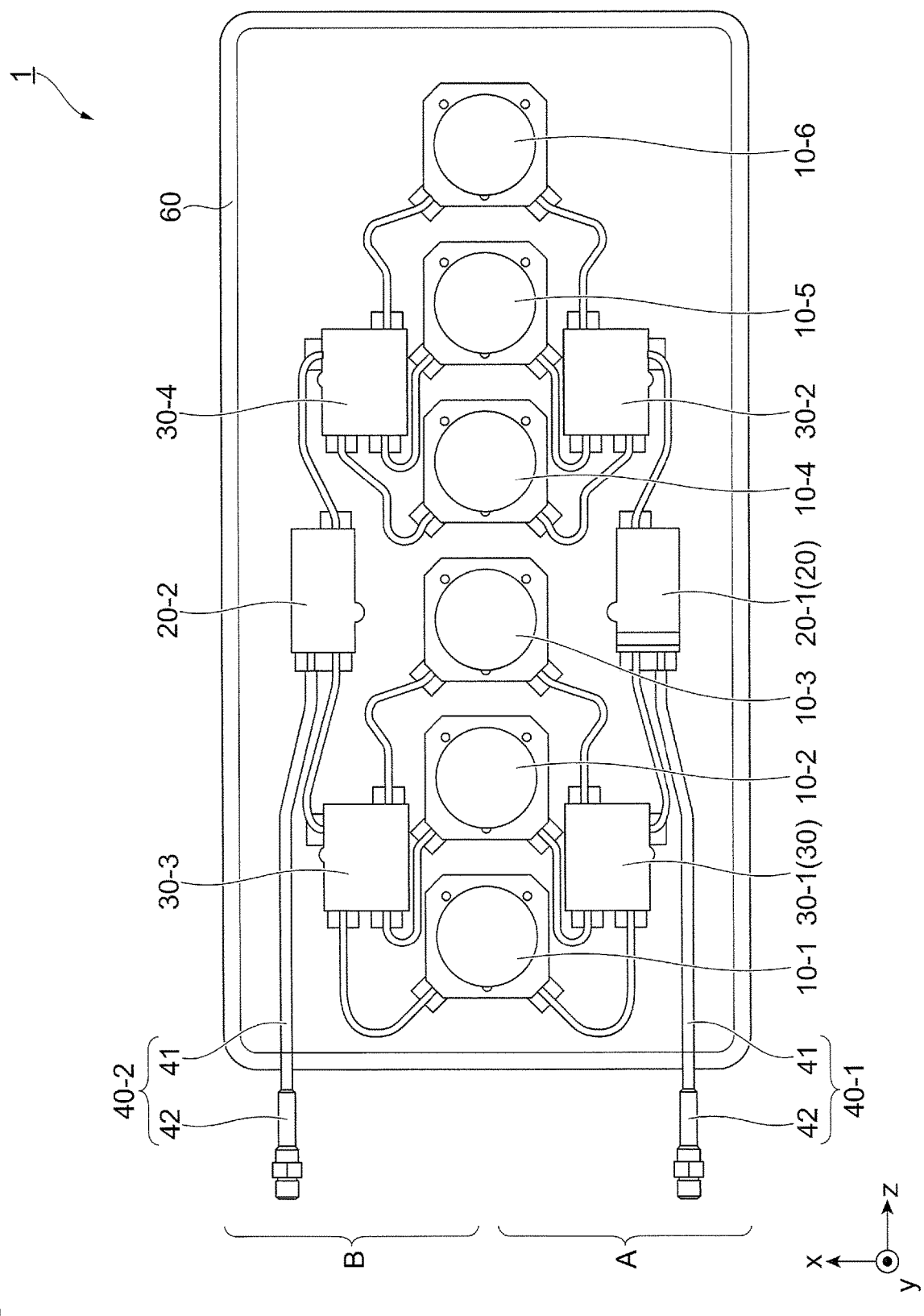
FIG. 2 is a plan view of the antenna structure.

FIG. 2 is a plan view of the antenna structure 1.

The antenna structure 1 includes the six antenna elements 10. The individual antenna elements 10 are referred to as the antenna elements 10-1, 10-2, 10-3, 10-4, 10-5 and 10-6. Note that the x direction, the y direction, and the z direction are the same as FIG. 1.

The antenna element 10 has a planar shape of a square in which the corners are rounded off. Note that the corners do not have to be rounded off, and the planar shape does not have to be a square.

The antenna structure 1 includes a pair of two-branch distributors 20. The individual distributors 20 are referred to as the distributors 20-1 and 20-2. Moreover, the antenna structure 1 includes four three-branch distributors 30. The individual distributors 30 are referred to as the distributors 30-1, 30-2, 30-3 and 30-4.

Two signals are inputted to the antenna structure 1 from the two input-output signal lines 40 (the input-output signal lines 40-1 and 40-2). Signals of polarizations 90-degree different in oscillating direction (specifically, polarizations of ±45° with respect to the z direction) are transmitted to the input-output signal lines 40-1 and 40-2. In other words, the antenna structure 1 is of a dual polarization type and is capable of dealing with 2MIMO (Multiple-Input and Multiple-Output).

The connection relationship will be described.

The input-output signal line 40-1 is connected to an input terminal of the two-branch distributor 20-1. The distributor 20-1 branches the inputted signal into two to output thereof from two output terminals. One of the output terminals of the distributor 20-1 is connected to an input terminal of the distributor 30-1. The other output terminal of the distributor 20-1 is connected to an input terminal of the distributor 30-2.

The input-output signal line 40-2 is connected to an input terminal of the two-branch distributor 20-2. The distributor 20-2 branches the inputted signal into two to output thereof from two output terminals. One of the output terminals of the distributor 20-2 is connected to an input terminal of the distributor 30-3. The other output terminal of the distributor 20-2 is connected to an input terminal of the distributor 30-4.

Each of the antenna elements 10-1 to 10-6 includes two input terminals.

Each of three output terminals of the three-branch distributor 30-1 is connected to one of the input terminals of each of the antenna elements 10-1, 10-2 and 10-3. Moreover, each of three output terminals of the distributor 30-2 is connected to one of the input terminals of each of the antenna elements 10-4, 10-5 and 10-6.

Each of three output terminals of the three-branch distributor 30-3 is connected to the other one of the input terminals of each of the antenna elements 10-1, 10-2 and 10-3. Moreover, each of three output terminals of the distributor 30-4 is connected to the other one of the input terminals of each of the antenna elements 10-4, 10-5 and 10-6.

In this manner, the signal inputted to the input-output signal line 40-1 is distributed to one of the terminals of each of the antenna elements 10-1 to 10-6 (side A) via the distributors 20-1, 30-1 and 30-2. The signal inputted to the input-output signal line 40-2 is distributed to the other one of the terminals of each of the antenna elements 10-1 to 10-6 via the distributors 20-2, 30-3 and 30-4.

Note that, due to the reversibility of the antenna, the signals received by the antenna elements 10-1 to 10-6 are combined by reversely going through the above route to be outputted from the input-output signal lines 40-1 and 40-2.

As shown in FIG. 2, the distributors 20 and 30 and the signal lines 50 corresponding to the two respective polarizations are divided to be disposed on the side A and the side B (both sides) of an array of the antenna elements 10-1 to 10-6. This allows the distributors 20, 30 and the signal lines 50 to be arranged with ease.

Moreover, the input-output signal lines 40 (the input-output signal lines 40-1 and 40-2) corresponding to the two polarizations are provided in the direction along an array of the antenna elements 10-1 to 10-6, and are projected from a short side of the base 60 having a square planar shape. With this, to use the antenna structure 1 as a sector antenna, in the case where the array of the antenna elements 10-1 to 10-6 (the z direction) is arranged in a direction perpendicular to the ground surface (the vertical direction), which is the direction of gravity, wiring to be connected to the input-output signal lines 40 from above (in doors, from the ceiling side) or below (in doors, from the floor side) may be provided. In other words, wiring construction can be easily carried out. Further, even in the case where plural antenna structures 1 are arranged in parallel, the input-output signal lines 40 of the adjacent antenna structure 1 do not interrupt. In addition, it becomes possible to vertically pile the two antenna structures 1 for use. The wiring from the antenna structure 1 arranged on the upper side may be provided above, and the wiring from the antenna structure 1 arranged on the lower side may be provided below.

Figure 3A:
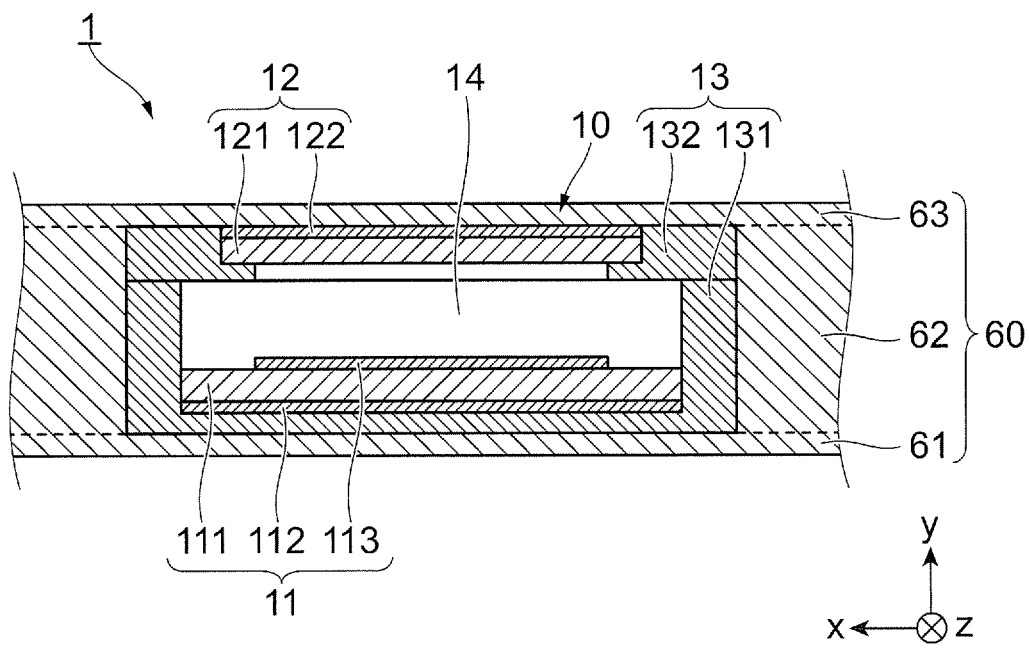
Figure 3B:
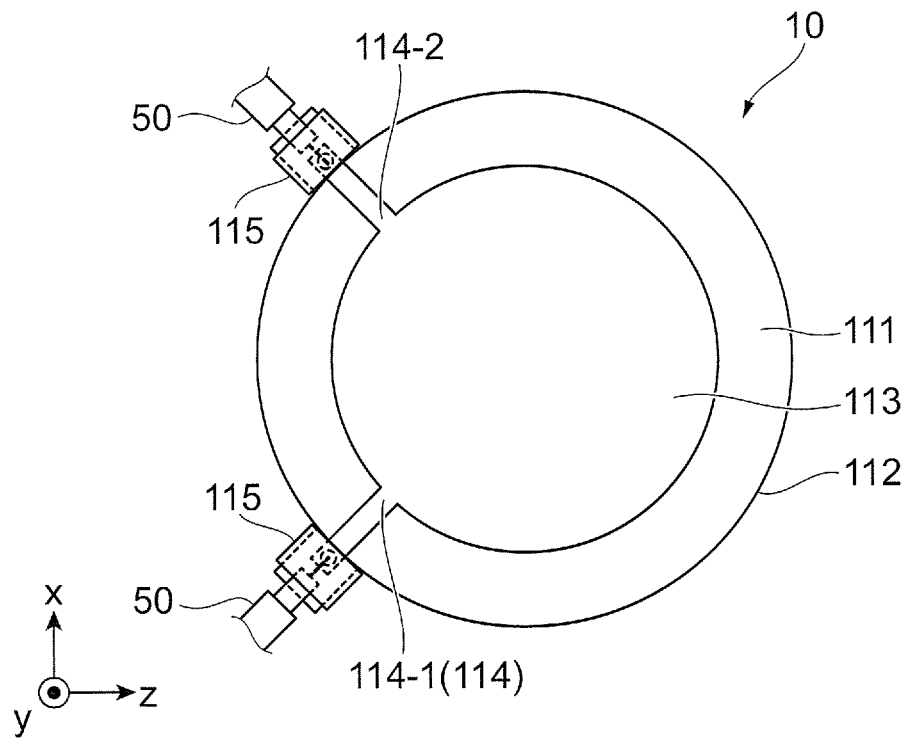

FIGS. 3A and 3B show diagrams illustrating a structure of the antenna element 10. FIG. 3A is a cross-sectional view of vicinity of the antenna element 10 (a cross-sectional view in the x direction in FIG. 2), and FIG. 3B is a plan view of a radiation element part 11 of the antenna element 10. FIG. 3A shows, in addition to the antenna element 10, the base 60 in the vicinity of the antenna element 10.

First, with reference to FIG. 3A, the base 60 will be described.

The base 60 includes: a lower layer part 61 positioned at the lower side of the antenna structure 1; an embedding part 62 embedding the antenna elements 10, the distributors 20 and 30, the signal lines 50 and part of the input-output signal lines 40; and an upper layer part 63 positioned at the upper side of the antenna structure 1. Here, the lower layer part 61, the embedding part 62 and the upper layer part 63 are configured as one piece (a continuous structure). That is, the antenna elements 10, the distributors 20 and 30, the signal lines 50 and part of the input-output signal lines 40 are sealed to be enclosed by the lower layer part 61, the embedding part 62 and the upper layer part 63 constituting the base 60. In other words, the antenna structure 1 is in the state of being solidified by the base 60. Then, the antenna structure 1 is configured in a flat-plate shape having a flat surface.

Note that the lower layer part 61, the embedding part 62 and the upper layer part 63 do not have to be configured as one piece (a continuous structure).

The antenna element 10 includes: a radiation element part 11 constituting a patch antenna; a parasitic element part 12; and a container part 13. The radiation element part 11 includes an insulating substrate 111; a ground electrode 112 provided on a back surface (a surface in the −y direction) of the insulating substrate 111; and a radiation electrode 113 provided on a front surface (a surface in the +y direction) of the insulating substrate 111. The parasitic element part 12 includes an insulating substrate 121 and a parasitic electrode 122 provided on a front surface (a surface in the +y direction) of the insulating substrate 121.

The insulating substrates 111 and 121 are constituted by an electrical insulating material with a low dielectric loss (tan δ), for example, glass epoxy, polytetrafluoroethylene, or the like. The ground electrode 112, the radiation electrode 113 and the parasitic electrode 122 are constituted by a thin conductive material, such as copper (foil) or silver (foil).

Then, the container part 13 includes: a bottom part 131 having a square outer shape in a planar view with a circular cup-shaped hollow at the center in a planar view; and a lid part 132 holding the parasitic element part 12 and functioning as a lid for the bottom part 131. The bottom part 131 contains the radiation element part 11. The parasitic element part 12 is fitted into the lid part 132 from the front surface side (from the y direction side). In other words, the parasitic element part 12 is dropped into a concave provided on the front surface side (the y direction side) of the lid part 132 so that the front surface of the lid part 132 and the front surface of the parasitic element part 12 are flat. Thus, the container part 13 holds the radiation element part 11 and holds the parasitic element part 12 at a predetermined distance from the radiation element part 11. That is to say, the radiation element part 11 and the parasitic element part 12 are disposed to face each other.

Note that, in the container part 13, the bottom part 131 and the lid part 132 are fastened. Here, as an example, holes provided in the lid part 132 are fitted over the protrusions provided on the bottom part 131 to thereby perform positioning between the bottom part 131 and the lid part 132 (refer to small circles depicted on the front surface of the antenna element 10 in FIGS. 1, 2A and 2B). Then, the bottom part 131 and the lid part 132 are fixed by a bonding agent. The antenna elements 10 are enclosed by the base 60 (the lower layer part 61, the embedding part 62 and the upper layer part 62) to be sealed; thereby the bottom part 131 and the lid part 132 may be simply fixed by the bonding agent. Moreover, the bottom part 131 and the lid part 132 may be fastened by screws, or may be fastened by a snap-fit structure in which convex members are fitted into concave parts.

With FIGS. 3A and 3B, the radiation element part 11 will be described.

The insulating substrate 111 of the radiation element part 11 is configured to have a circular planar shape. Then, the ground electrode 112 is formed on all over the back surface (the surface in the −y direction) of the insulating substrate 111. At the center portion of the front surface (the surface in the +y direction) of the insulating substrate 111, the radiation electrode 113 having a circular planar shape is formed. In other words, the radiation element part 11 constitutes the patch antenna.

Then, at two locations of the radiation electrode 113, feeding electrodes 114-1 and 114-2 (when not distinguished, offered to as feeding electrodes 114) are provided to enable inner conductors (core wires) of the signal lines 50 constituted by the coaxial cables to be connected. To each of the feeding electrodes 114-1 and 114-2, the inner conductor (the core wire) of the signal line 50 constituted by the coaxial cable is connected. The feeding electrodes 114-1 and 114-2 of the radiation electrode 113 are provided to be separated 90° around the center of the radiation electrode 113. Consequently, feeding the radiation electrode 113 from the feeding electrodes 114-1 and 114-2 separated 90° from each other makes it possible to radiate polarizations having oscillation directions of the electric field different 90 from each other (cross polarizations). In other words, it is possible to transmit/receive the radio frequencies of orthogonal polarizations by the single radiation electrode 113.

Note that an outer conductor (a shield) of the signal line 50 constituted by the coaxial cable is connected to the ground electrode 112 provided on the back surface of the insulating substrate 111 by a piece of hardware 115. The piece of hardware 115 is provided to cover the exposed inner conductor (the core wire).

Here, the feeding electrodes 114-1 and 114-2 are provided +45° and −45° to the z direction, respectively; therefore, the polarizations are ±45° polarizations to the vertical direction. Note that, when the feeding electrodes 114-1 and 114-2 are provided 0° and 90° to the z direction, respectively, the polarizations are the polarization in the vertical direction (the vertical polarization) and the polarization orthogonal to the vertical direction (the horizontal polarization).

There is a gap (space) 14 to secure an air layer between the radiation element part 11 and the parasitic element part 12 of the antenna element 10 (inside the antenna element 10). The container part 13 holds the radiation element part 11 and the parasitic element part 12 and seals (encapsulates) the radiation element part 11 and the parasitic element part 12 for preventing the material constituting the base 60 from entering. In other words, the radiation element part 11 and the parasitic element part 12 of the antenna element 10 are separated from the base 60 in the interior of the antenna element 10.

This is because entrance of the material constituting the base 60 between the radiation element part 11 and the parasitic element part 12 changes the dielectric loss or impedance, to thereby change the characteristics of the antenna element 10. That is to say, the antenna element 10 maintains the characteristics as they were designed for a single item. Moreover, the upper layer part 63 of the base 60 is preferably thin so that the characteristics of the antenna element 10 are not affected.

Assuming that, as an example, the antenna element 10 is used for transmission/reception of radio frequencies in 4.7 GHz frequency band, the diameter of the radiation electrode 113 is 19.5 mm.

As described above, forming the radiation element part 11 of the antenna element 10 into the patch antenna allows the antenna element 10 to be low profile. Then, the antenna structure 1 also has low profile.

Note that the radiation element part 11 of the antenna element 10 may be other than the patch antenna. As the antenna element 10, it is preferable to have a small thickness (the length in the y direction) (to have low profile).

Though not shown in the figure, each of the distributors 20 and 30 includes a container part similar to that of the antenna element 10, and a distribution circuit constituted by a microstrip line is contained at the bottom part of the container part, the distribution circuit distributing the signals. The bottom part is covered with a lid part. Then, the distribution circuit is constituted by forming a ground electrode on a back surface of an insulating substrate and forming wiring on a front surface of the insulating substrate. In each of the distributors 20 and 30, also, the bottom part and the lid part are fastened to prevent the material constituting the base 60 from entering the interior of the container part where the distribution circuit is provided (inside each of the distributors 20 and 30), and there is a gap (space) for securing an air layer between the distribution circuit constituted by the microstrip line and the lid part. In other words, the distribution circuit of each of the distributors 20 and 30 is separated from the base 60 inside each of the distributors 20 and 30.

This is also because entrance of the material constituting the base 60 to the surface of the microstrip line constituting the distribution circuit changes the dielectric loss or impedance, to thereby change the transfer characteristics of the microstrip line.

On the other hand, the input-output signal line 40 and the signal line 50 are the coaxial cables. Consequently, even though the base 60 is embedded with the input-output signal lines 40 and the signal lines 50, the dielectric loss or impedance is not changed. In other words, in the antenna structure 1 to which the first exemplary embodiment is applied, the antenna element 10, the distributors 20 and 30, in which the characteristics thereof are changed by the change of the dielectric loss or impedance due to entrance of the material constituting the base 60, have sealed structures with a secured air layer, whereas the signal line 50 and the input-output signal line 40 connecting the antenna elements 10, the distributors 20 and 30 are the coaxial cables; therefore, the structure embedding these components in the base 60 does not affect the characteristics.

Note that the outer conductors of the input-output signal lines 40 and the signal lines 50 are connected to the ground electrodes of the distributors 20 and 30 and the ground electrodes of the radiation element parts 11 in the antenna elements 10 to have a common ground potential (GND potential).

Configuration of the distribution circuits in the distributors 20 and 30 making the propagation distances of the signals from the input-output signal lines 40-1 and 40-2 to the antenna elements 10-1 to 10-6 equal causes the antenna elements 10-1 to 10-6 to radiate the signals of the same phase.

In other words, the radio frequencies are radiated in the direction orthogonal to the surface of the antenna structure 1 (the y direction). In this case, the distributors 20 and 30 are sometimes referred to as equal distributors.

On the other hand, configuration of the distribution circuits in the distributors 20 and 30 making the propagation distances of the signals from the input-output signal lines 40-1 and 40-2 to the antenna elements 10-1 to 10-6 gradually different (phase is shifted) in the antenna elements 10-1 to 10-6 causes the radio frequencies to be radiated with deviation (being tilted) in the z direction or the −z direction from the direction orthogonal to the surface of the antenna structure 1 (the y direction). In this case, the distributors 20 and 30 are sometimes referred to as phase-shift distributors.

Note that, of the distributors 20 and 30, it may be possible to use the distributors 20 as the equal distributors and to use the distributors 30 as the phase-shift distributors. At this time, a phase difference may be provided between the distributor 20-1 and the distributor 20-2, which are the equal distributors. Further, it may be possible that the distributors 20 and 30 are used as the equal distributors, and the lengths of the signal line 50 connecting the distributor 20 and the distributor 30 and/or the signal line 50 connecting the distributor 30 and the antenna element 10 are varied to provide the phase difference.

As described above, the antenna element 10 in the antenna structure 1 to which the first exemplary embodiment is applied included the radiation element part 11 and the parasitic element part 12. However, the parasitic element part 12 does not have to be included. In this case, an opening for inserting the parasitic element part 12 may not be provided in the lid part of the container part 13. Moreover, the parasitic electrode 122 of the parasitic element part 12 may be eliminated. In other words, it is preferable that the material constituting the embedding part 62 is not allowed to enter the radiation element part 11.

Note that, in the case where the characteristics are not affected even though the dielectric loss or impedance is changed by the material constituting the embedding part 62, it is unnecessary to provide the gap 14 for securing the air layer in the antenna element 10 or the gap 14 for securing the air layer in the distributors 20 and 30.

The antenna structure 1 is manufactured as follows, as an example.

First, a mold configured to correspond to the outer shape of the antenna structure 1 is prepared.

The antenna elements 10, the distributors 20 and 30 are connected by the input-output signal lines 40 and the signal lines 50.

Next, the mold is disposed so that the bottom surface thereof is horizontal. Then, the antenna elements 10, the distributors 20 and 30 connected by the input-output signal lines 40 and the signal lines 50 are disposed at planar surface positions to be brought into the state being separated from the bottom surface of the mold by a distance corresponding to the thickness of the lower layer part 61 (the length in the y direction). Note that the mold is configured to let the connectors 42 and part of the coaxial cables 41 in the input-output signal lines 40 out of the mold.

Then, the material to be the case 60 in the uncured state is poured into the mold, and thereafter, cured. Note that the material in the uncured state is poured to cover the surface of each of the antenna elements 10, the distributors 20 and 30 so that the upper layer part 63 can be constituted after the curing. With this, the lower layer part 61, the embedding part 62 and the upper layer part 63 constituting the base 60 are formed as one piece (a continuous structure).

Together with the antenna elements 10, the distributors 20 and 30 connected by the input-output signal lines 40 and the signal lines 50, the cured base 60 is taken out of the mold, and thereby the antenna structure 1 is manufactured.

At this time, the material in the uncured state to serve as the base 60 is cured; therefore, the antenna elements 10, the distributors 20 and 30 connected by the input-output signal lines 40 and the signal lines 50 are solidified in the state of being embedded in the base 60.

Note that it may be possible to dispose the antenna elements 10, the distributors 20 and 30 connected by the input-output signal lines 40 and the signal lines 50 at the planar surface positions after the lower layer part 61 is formed, and to form the embedding part 62 and the upper layer part 63. Moreover, it may also be possible that, after the upper layer part 63 is formed, the antenna elements 10, the distributors 20 and 30 connected by the input-output signal lines 40 and the signal lines 50 are disposed at planar surface positions in an upside down state, and the embedding part 62 and the lower layer part 61 are formed.

It is sufficient that the material in the uncured state to serve as the base 60 is soft and is able to be charged in the mold. Then, it is acceptable that the material can be cured by evaporation of a solvent, heating, ultraviolet light irradiation, or the like. For this, many kinds of resins, rubbers, silicone, or the like can be used. For example, epoxy, urethane, EVA (ethylene-vinyl-acetal copolymer), olefin, flexible polyvinyl chloride, butadiene rubber, various kinds of silicone or the like can be included. In addition, other than those described above, the base 60 may be constituted by a material made by solidifying powdered wood by a bonding agent for molding or the like.

As the material in the uncured state to serve as the base 60, a two-pack curable type resin can be preferably used, and more preferably, resin of two-component reactive type at room temperature can be used. Examples of such materials include epoxy, urethane, acrylic and silicone. Use of such materials eliminates the need for heating a material at high temperature to cure the material in the uncured state. Therefore, the processing can be easy and the risk of deteriorating the constituents of the antenna structure 1, such as the antenna elements 10, the distributors 20 and 30 (including the input-output signal lines 40 and the signal lines 50) by heat can be lowered. As a matter of course, the constituents of the antenna structure 1 may be heated at a low temperature, which does not damage the constituents, to accelerate the curing reaction.

It is preferable that the material constituting the base 60 has not more than a Shore D hardness of 60 after the material is cured from the uncured state. With not more than the Shore D hardness of 60, the antenna structure 1 has flexibility that can follow the curved shape in the place of installation to some extent. Further, it is preferable that the material constituting the base 60 has not more than a Shore A hardness of 50 after the material is cured from the uncured state. With not more than the Shore A hardness of 50, the antenna structure 1 has high flexibility as a whole that can further follow the curved shape in the place of installation. On the other hand, low hardness of the material constituting the base 60 provides high flexibility, but reduces the ability to protect the constituents of the antenna structure 1 from external forces. Note that, in accordance with the shape of the place where the antenna structure 1 is to be installed, the hardness of the material constituting the base 60 can be appropriately selected.

In the above, the base 60 includes the lower layer part 61 and the upper layer part 63 in addition to the embedding part 62; however, the base 60 does not have to include one of the lower layer part 61 and the upper layer part 63, or both.

Moreover, it was assumed that the base 60 was embedded with asperities formed by the antenna elements 10, the distributors 20 and 30 and so forth, to thereby make the back surface and the front surface of the antenna structure 1 flat; however, the irregularities formed by the antenna elements 10, the distributors 20 and 30 may be sensed. In this case, the back surface of the antenna structure 1 is flat, but the front surface thereof has irregularities reflecting the irregularities formed by the antenna element 10, the distributors 20 and 30. Then, in the case where the upper layer part 63 is not provided, the embedding part 62 of the base 60 may adhere to the side surfaces of the antenna element 10, the distributors 20 and 30 (the surfaces in the direction in which the back surface of the antenna structure 1 and a perpendicular line intersect each other) to support thereof. At this time, the embedding part 62 may adhere only to a part of the side surfaces of the antenna elements 10, the distributors 20 and 30 in the width direction (the y direction). In other words, there may be a state in which the embedding part 62 adheres only to the lower side of the side surfaces. Then, the slim-type (low-profile) antenna elements 10 form the antenna structure 1 into a flat-plate shape.

Modified Example

Next, a modified example of the antenna element 10 (an antenna element 10') will be described.

The antenna element 10 was provided with the gap 14 to secure the air layer between the radiation element part 11 and the parasitic element part 12.

In the antenna element 10', which is the modified example, a foam (a porous body) 15 is provided instead of the gap 14 on the radiation element part 11. Note that the antenna element 10' is effective in the case where the parasitic element part 12 is not provided and direct contact with the material constituting the base 60 changes the dielectric loss or impedance, and thereby the antenna characteristics are changed.

Figure 4:
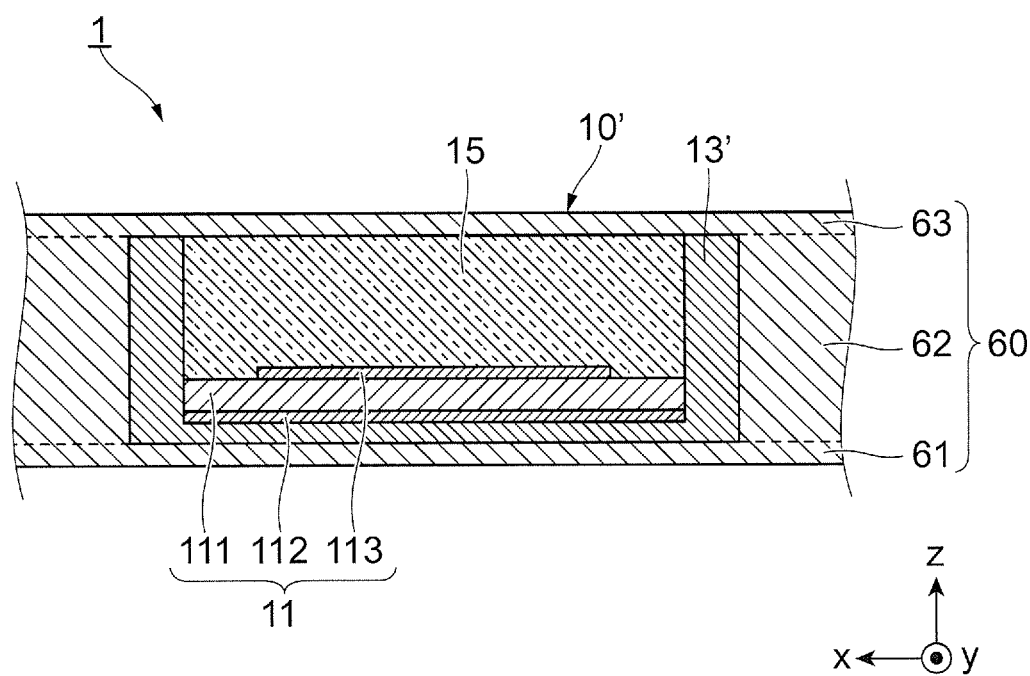
FIG. 4 is a cross-sectional view illustrating a structure of an antenna element, which is a modified example.

FIG. 4 is a cross-sectional view illustrating a structure of the antenna element 10' as a modified example. The portions same as FIG. 3A will be assigned with the same reference signs, and descriptions thereof will be omitted.

The container part 13' is configured only by a cup-shaped bottom part. The cup-shaped bottom contains the radiation element part 11. Then, the foam 15 is provided on the radiation element part 11.

As the foam 15, for example, foamed polyethylene, an acrylic sponge, or an urethane sponge can be applied. Even though the material in the uncured state to serve as the embedding part 62 of the base 60 is going to enter, the foam 15 suppresses the entrance and, similar to the gap 14 in the antenna element 10, functions as the air layer because the foam 15 includes a lot of air.

Second Exemplary Embodiment

In the first exemplary embodiment, the antenna structure 1 had a rectangular planar shape. An antenna structure 2 to which the second exemplary embodiment is applied has a circular planar shape.

Figure 5B:
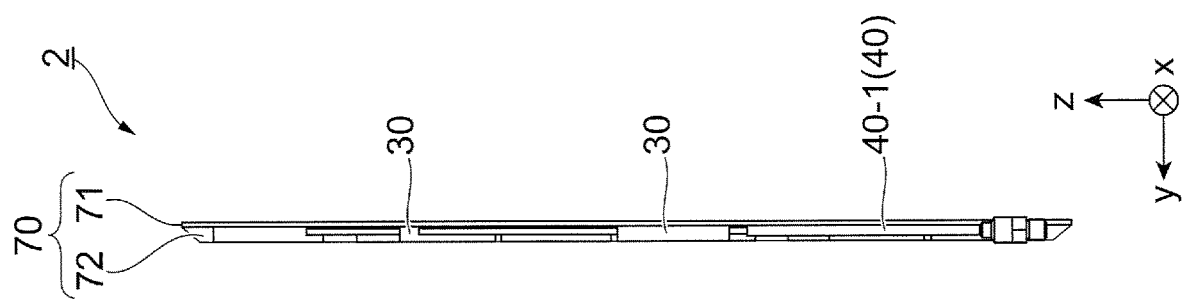
FIGS. 5A and 5B show diagrams showing an antenna structure to which the second exemplary embodiment is applied, where
Figure 5A:
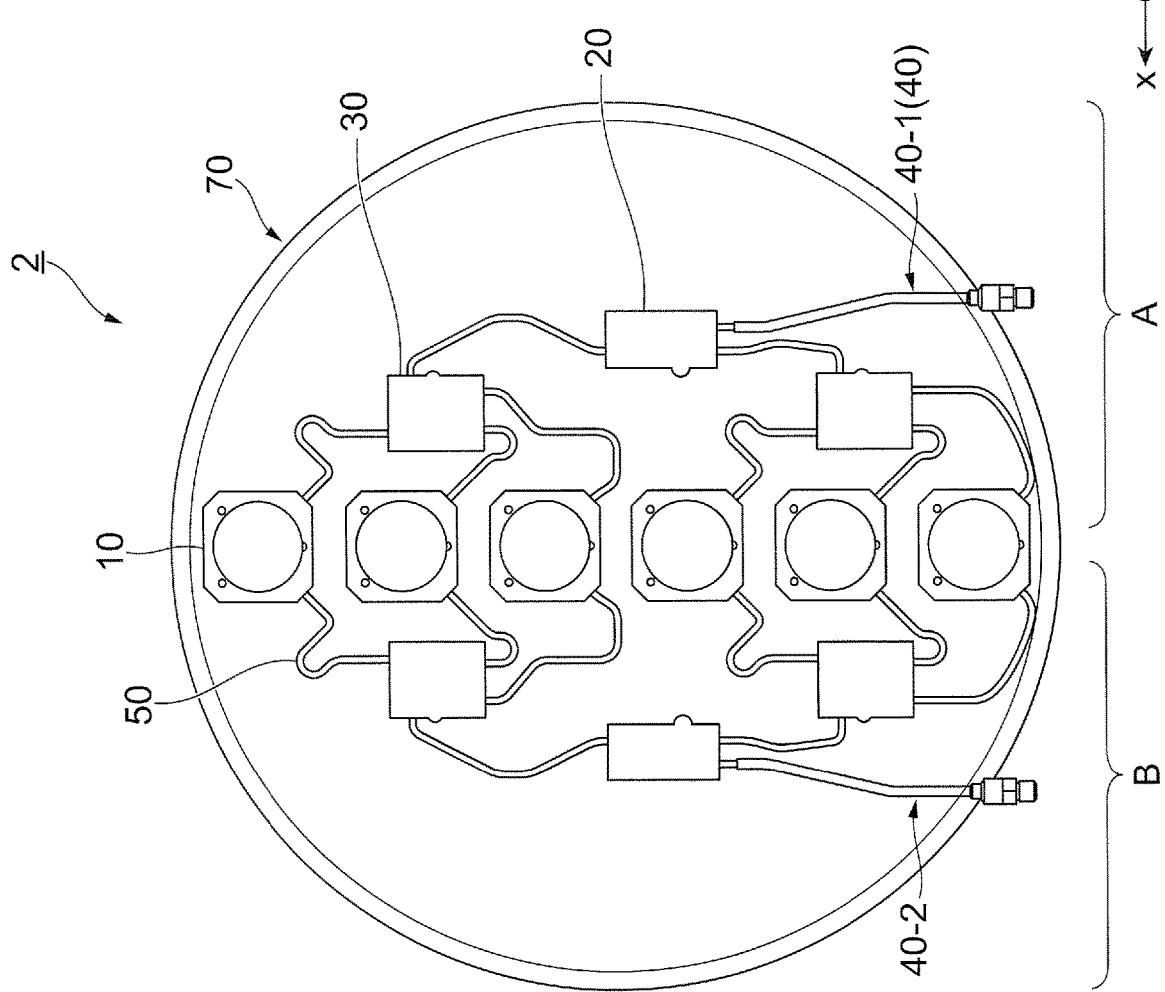

FIGS. 5A and 5B show diagrams showing the antenna structure 2 to which the second exemplary embodiment is applied. FIG. 5A is a plan view and FIG. 5B is a side elevational view.

The antenna structure 2 includes the antenna elements 10, the distributors 20 and 30, the input-output signal lines 40, the signal lines 50 and a base 70. As shown in FIGS. 5A and 5B, in the antenna structure 2, the antenna elements 10, the distributors 20 and 30, the input-output signal lines and the signal lines 50 are similar to those in the antenna structure shown in FIG. 2. Therefore, the same reference signs are assigned and descriptions thereof will be omitted.

However, the base 70 is configured to have a circular planar shape. In other words, even though the base 70 is rotated around the center thereof as an axis, the base 70 seems the same (appearance does not change).

Figure 6A:
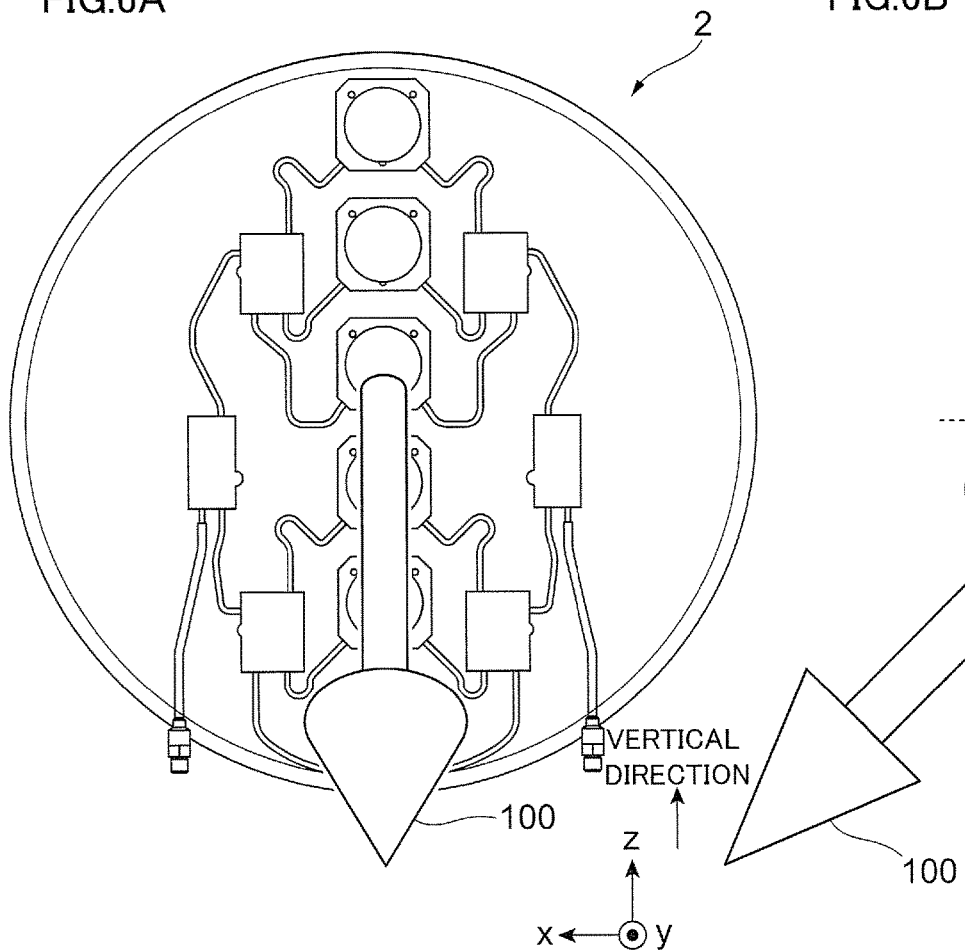
FIGS. 6A to 6C shows diagrams showing a case in which the antenna structure is set so that an array of the antenna elements (z direction) faces the vertical direction, where
Figure 6B:
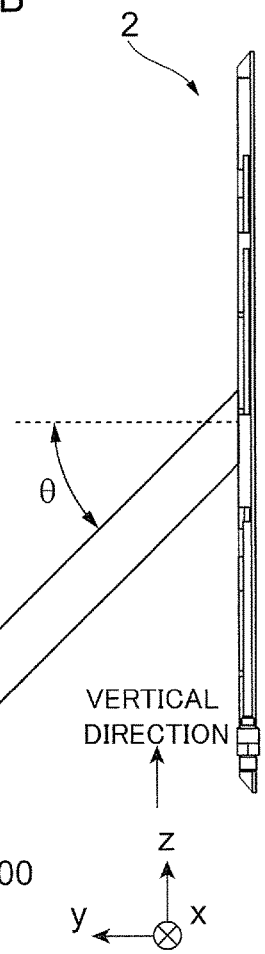
Figure 6C:
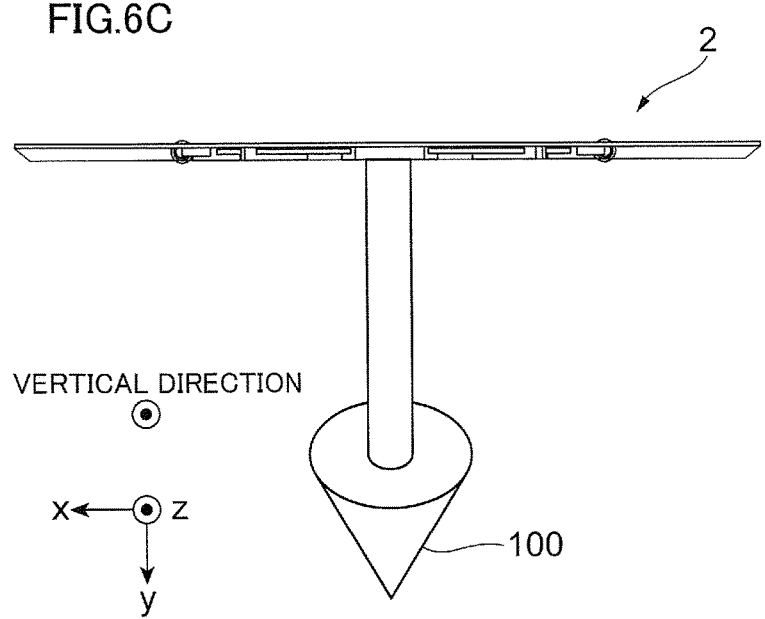

FIGS. 6A to 6C show diagrams showing a case in which the antenna structure 2 is set so that an array of the antenna elements 10 (the z direction) faces the vertical direction. FIG. 6A is a front elevational view, FIG. 6B is a side elevational view and FIG. 6C is a top view. In other words, there is shown a case in which the z direction of the antenna structure 2 (the array direction of the antenna elements 10) is arranged in the vertical direction.

It is assumed that the antenna structure 2 is set so that the radio frequencies (beam 100) from the antenna element 10 are tilted downward in the array direction of the antenna elements 10 (z direction) by the distributors 20 and 30.

Setting the antenna structure 2 so that the array of the antenna elements 10 (z direction) faces the vertical direction causes the beam 100 from the antenna structure 2 to head downwardly in the vertical direction by the tilt angle θ as shown in FIGS. 6A, 6B and 6C.

FIG. 7 shows diagrams showing a case in which the antenna structure 2 is set so that an array of the antenna elements 10 (z direction) faces an oblique direction tilted from the vertical direction. FIG. 7A is a front elevational view, FIG. 7B is a side elevational view and FIG. 7C is a top view.

Setting the antenna structure 2 so that the array of the antenna elements 10 (z direction) faces the oblique direction tilted from the vertical direction causes the beam 100 from the antenna structure 2 to head obliquely downward as shown in FIGS. 7A, 7B and 7C. In other words, rotation of the antenna structure 2 causes the beam 100 to face a direction of a generating line of a cone having a vertical angle of 2θ. Consequently, by only rotating the antenna structure 2 around the center of the circle of the base 70 as an axis, it is possible to cause the direction of transmitting/receiving the radio frequencies (direction of the beam 100) to head for the center portion in a room. That is to say, rotation of the antenna structure 2 causes the tilt direction (tilt angle) configured by the antenna structure 2 to correspond to a bearing (azimuth angle) of transmission/reception of the radio frequencies; thereby the tilt can be used for changing the azimuth angle.

Since the antenna structure 2 has the circular planar shape, though the array of the antenna elements 10 (z direction) is set to face the oblique direction tilted from the vertical direction and the antenna structure 2 is rotated around the center of the circle of the base 70 as an axis, the appearance does not change. Consequently, though the antenna structure 2 is installed to be exposed at an end portion in a room and is rotated, no difference can be seen in the appearance of the antenna structure 2; therefore, the landscapes and the environments are not damaged.

Note that, in an ordinary antenna, in the case of changing the direction (the azimuth angle) of transmitting/receiving the radio frequencies, there was no other choice but to change the attachment position of the antenna in accordance with the azimuth angle, or to change the beam direction of the antenna itself.

In contrast thereto, the antenna structure 2 to which the second exemplary embodiment is applied is, similar to the antenna structure 1 to which the first exemplary embodiment is applied, installed with ease to a wall or the like by the adhesive coated on the back surface or the front surface thereof. Accordingly, in the case where the azimuth angle is to be changed, the antenna structure 2 is detached and rotated around the center of the base 70 as an axis, and thereby the antenna structure 2 can correspond to the new azimuth angle. Moreover, since the antenna structure 2 can be set at an arbitrary azimuth angle by rotation, preparation of one model makes it possible to be ready for various azimuth angles.

Note that the antenna structure 1 having the rectangular planar shape (FIG. 2) may be used, but the appearance of the antenna structure 1 is changed by rotation. Therefore, in the case where the antenna structure 2 is installed to be exposed in a room or the like, the landscapes or the environments are damaged.

In other words, in the antenna structure 2, the planar shape of the base 60 is formed into a circle to eliminate the difference in the appearance caused by rotation; thereby the tilt is used for changing the azimuth angle. Note that, when the change in the appearance caused by rotation is small, the change by the rotation is less likely to be visually observed, and therefore, the landscapes or the environments are less likely to be damaged. Consequently, the planar shape of the base 60 may be a polygon or the like.

Third Exemplary Embodiment

In the antenna structure 1 to which the first exemplary embodiment was applied and the antenna structure 2 to which the second exemplary embodiment was applied, the antenna elements 10 were arranged in a single line.

In the antenna structure 3 to which the third exemplary embodiment is applied, the antenna elements 10 are arranged in plural lines.

Figure 8:
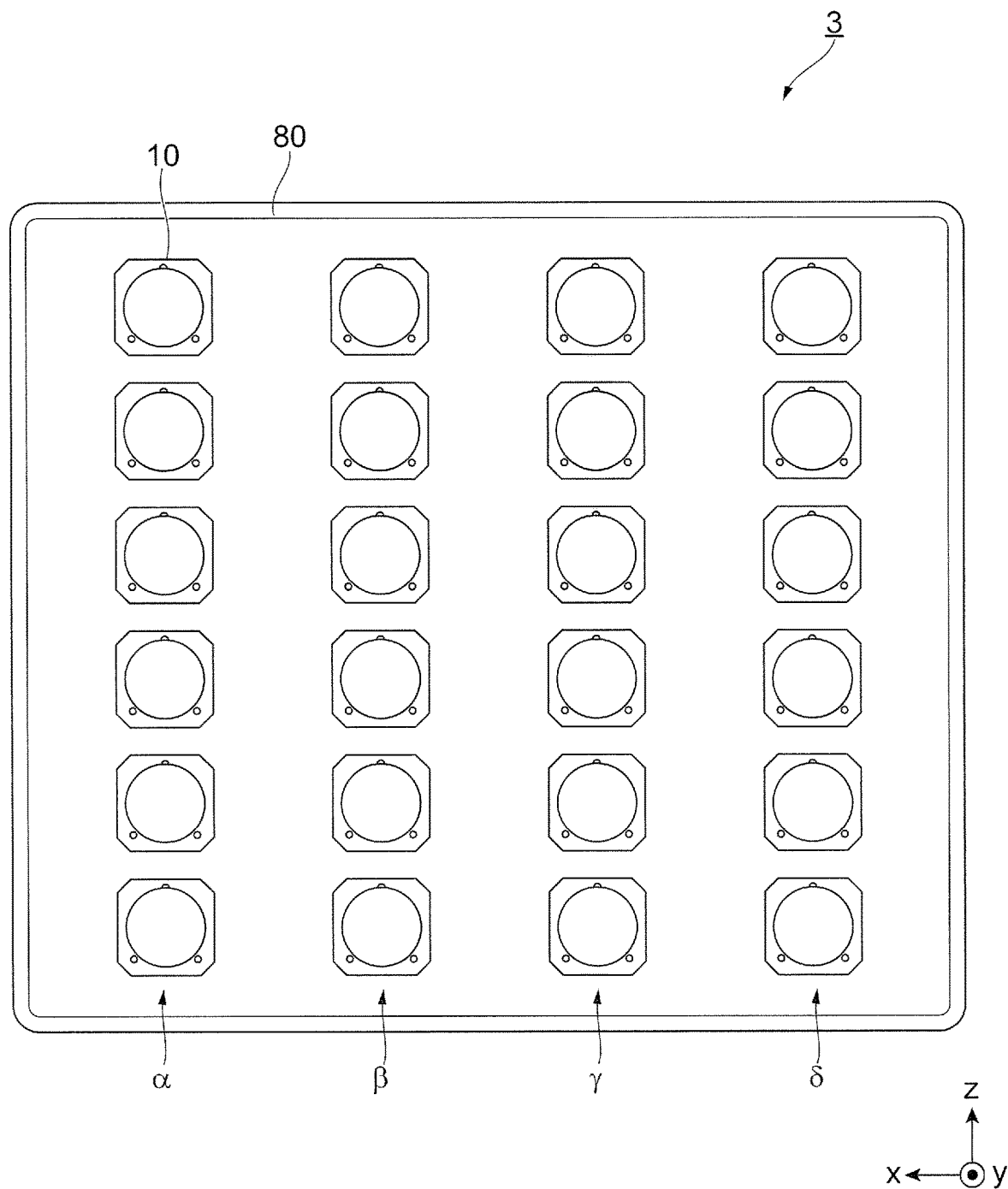
FIG. 8 is a plan view of an antenna structure to which the third exemplary embodiment is applied.

FIG. 8 is a plan view of the antenna structure 3 to which the third exemplary embodiment is applied.

The antenna structure 3 includes the antenna elements 10 and a base 80, the antenna elements 10 including four arrays arranged in parallel in the x direction, each of the arrays including six antenna elements arranged in the z direction. Note that the arrays in the z direction are referred to as an array α, an array β, an array γ and an array δ, respectively. Here, the distributors 20 and 30 shown in FIGS. 2, 5A, 5B and 5C are not shown; however, similar to FIGS. 2, 5A, 5B and 5C, the distributors 20 and 30 may be provided along the arrays of antenna elements 10. It may also be possible that the antenna structure 3 is constituted only by the antenna elements 10 and the distributors 20 and 30 are connected to the antenna elements 10.

The base 80 is configured in the similar manner as the base 60 in the antenna structure 1and the base 70 in the antenna structure 2.

In this manner, also, the antenna structure 3 can be formed into a thin type, and it becomes possible to provide the flexibility to the antenna structure 3 as a whole by constituting the base 80 with a material having the flexibility.

Similar driving of the arrays α, β, γ and δ of the antenna elements 10 makes it possible to reduce the beam width from the antenna structure 3. Moreover, by allocating the radio frequencies of different wavelengths to the arrays α, β, γ and δ of the antenna elements 10, it becomes possible to deal with 4MIMO, 8MIMO or the like. In addition, it may be possible to individually drive the plural respective antenna elements 10 to constitute radio frequency space on the front surface of the antenna structure 3.

In the antenna structure 1 to which the first exemplary embodiment was applied to the antenna structure 3 to which the third exemplary embodiment was applied, the six antenna elements 10 were arranged in line in the z direction, but the number of antenna elements 10 is not limited to six and other numbers may be adopted. Moreover, the number of distributors 20 and 30 is not limited to two and four, respectively, and other numbers may be adopted. In addition, arrangement of the antenna elements 10 is not necessarily the arrays; the antenna elements 10 may be arranged to be alternately shifted.

So far, the first to third exemplary embodiments have been described; however, various modifications may be available without deviating from the gist of the present invention.

REFERENCE SIGNS LIST 1, 2, 3 . . . Antenna structure
10, 10-1 to 10-6, 10' . . . Antenna element
11 . . . Radiation element part
12 . . . Parasitic element part
13, 13' . . . Container part
14 . . . Gap (Space)
15 . . . Foam (Porous body)
20, 20-1, 20-2, 30, 30-1 to 30-4 . . . Distributor
40, 40-1, 40-2 . . . input-output signal line
50 . . . Signal line
60, 70, 80 . . . Base
61 . . . Lower layer part
62 . . . Embedding part
63 . . . Upper layer part
100 . . . Beam
111, 121 . . . Insulating substrate
112 . . . Ground electrode
113 . . . Radiation electrode
114, 114-1, 114-2 . . . Feeding electrode
122 . . . Parasitic electrode
131 . . . Bottom part
132 . . . Lid part

The invention claimed is:

1. An antenna structure comprising:
a plurality of antenna elements configured individually and arranged discretely;
a base adhering to at least a side surface of the plural antenna elements, being embedded with the plural antenna elements to fix thereof, and forming an outer shape of the antenna structure into a plate shape; and
a distributor configured separately from the plurality of antenna elements, the distributor distributing a signal to the antenna elements, combining the signal from the antenna elements or changing a phase of the signal, being embedded in the base to be fixed with at least a side surface of the distributor adhering to the base, and being connected to the antenna elements by a cable transmitting and receiving the signal and being embedded in the base.

2. The antenna structure according to claim 1, wherein the cable is coaxial and has flexibility.

3. The antenna structure according to claim 1, wherein the base is constituted by a material having flexibility, and the antenna elements and the distributor are constituted by a material not having flexibility.

4. The antenna structure according to claim 3, wherein the material constituting the base has a hardness not more than a Shore D hardness of 60.

5. The antenna structure according to claim 1, wherein the plural antenna elements are arranged in a line.

6. The antenna structure according to claim 1, wherein the base has a circular or polygonal planar shape.

7. The antenna structure according to claim 6, wherein the base is rotated around a center of the planar shape of the base as an axis, to thereby make a direction of a tilt constituted by the plurality of antenna elements correspond to an azimuth angle of radio frequencies.

8. The antenna structure according to claim 1, wherein each of the plurality of antenna elements includes a radiation element part radiating or receiving radio frequencies, the radiation element part being separated from the base inside the antenna element.

9. The antenna structure according to claim 8, wherein each of the plurality of antenna elements includes a gap or a foam constituting an air layer on the radiation element part.

10. The antenna structure according to claim 1, wherein the distributor includes a distribution circuit propagating a signal, the distribution circuit being separated from the base inside the distributor.

11. The antenna structure according to claim 10, wherein the distributor includes a gap or a foam constituting an air layer on the distribution circuit.

12. The antenna structure according to claim 1, wherein
each of the plurality of antenna elements includes a radiation element part transmitting or receiving radio frequencies, the radiation element part being a patch antenna provided with a radiation electrode and a ground electrode facing each other, and
the radiation electrode has a circular planar shape and is provided with two feeding electrodes to make it possible to transmit or receive radio frequencies of cross polarizations.

13. The antenna structure according to claim 12, wherein
the plural antenna elements are arranged in a line to constitute a sector antenna, and
distributors each distributing a signal to the plurality of antenna elements, combining a signal from the plurality of antenna elements or changing a phase of a signal are provided to correspond to the respective cross polarizations, the distributors being divided to be provided on both sides of an array arranging the plural antenna elements.

14. The antenna structure according to claim 13, further comprising:
  input-output signal lines corresponding to the respective cross polarizations, the input-output signal lines inputting signals from outside and outputting signals to outside, wherein
  the input-output signal lines are drawn out of the base in a direction along the array of the plural antenna elements.

15. The antenna structure according to claim 1, wherein a sheet on which a picture is drawn is attached on one of a front surface and a back surface of the antenna structure, and an adhesive is applied on the other one of the front surface and the back surface of the antenna structure.

* * * * *